United States Patent [19]

Bisiach

[11] Patent Number: 4,677,274
[45] Date of Patent: Jun. 30, 1987

[54] ROBOT WITH POWER LASER BEAM

[76] Inventor: Bruno Bisiach, via Mentana 21, 10133 Turin, Italy

[21] Appl. No.: 779,499

[22] Filed: Sep. 24, 1985

[30] Foreign Application Priority Data

Oct. 9, 1984 [IT] Italy .................... 68002 A/84

[51] Int. Cl.⁴ .............................. B23K 26/02
[52] U.S. Cl. .................... 219/121 LV; 219/121 LU; 901/42; 350/486
[58] Field of Search ............... 219/121 LV, 121 LU, 219/121 LW, 121 LX; 414/917; 350/486, 623; 901/68, 42, 45, 50

[56] References Cited

U.S. PATENT DOCUMENTS 4,539,462  9/1985  Plankenhorn ............... 219/121 LV
4,542,278  9/1985  Taylor ....................... 219/121 LV

FOREIGN PATENT DOCUMENTS 0136589  10/1980  Japan ...................... 219/121 LU

*Primary Examiner*—M. H. Paschall
*Attorney, Agent, or Firm*—Paul & Paul

[57] ABSTRACT

An industrial robot with power laser beam for cutting or welding workpieces according to a desired pattern. The robot has six axes of movement—if desired a seventh axis can be provided—and a triaxial hollow head. The laser beam is generated by a generator separate and outside the robot and reaches the robot through a side opening whereafter it is axially directed by a pair of adjustable mirrors to the hollow head. Two further mirrors fitted in the head direct the beam perpendicularly on the workpiece to be cut or welded, according to a desired path.

10 Claims, 3 Drawing Figures

ROBOT WITH POWER LASER BEAM

BACKGROUND OF THE INVENTION

This invention relates to a robot with power laser beam for cutting or welding.

It is known to use a power laser beam for cutting various materials, including metal pieces. Further, are known machines capable of orienting the laser beam on the surface of the piece to be cut in order to obtain the desired cutting pattern, even when it does not have a plane form.

In this latter case, however, the known machines resort in general to the handling of the piece by means of suitable supports; this because the focusing head has not sufficient degrees of movement to allow for the execution of an optimun cut on workpieces having a complex tridimensional shape.

Whereas for pieces of small dimensions this cutting system can be accepted, the same cannot be said for pieces of comparatively large dimensions, whose handling becomes particularly troublesome.

SUMMARY AND OBJECTS OF THE INVENTION

It is an object of the present invention to eliminate or reduce the drawbacks of the abovementioned known machines, by carrying out a laser beam cutting or welding robot capable of orienting the laser beam perpendicularly to each zone of a tridimensional and even complex outline of a workpiece to be cut without handling the piece, namely using the mere movements of the robot to obtain—under suitable numeric control—the desired cutting or welding path.

The above and other purposes and advantages of the invention, which will appear from the following description, are obtained with a power laser beam cutting or welding robot having at least six degrees of freedom of movement comprising a movable base, a bearing column, a swinging arm and a triaxial hollow head, characterized in that said robot comprises at least one side opening adapted to receive a laser beam coming from an outer laser generator which is separated from said robot, in said arm being mounted a first pair of reflecting mirrors so disposed as to axially direct said laser beam towards said triaxial hollow head where is mounted a second pair of reflecting mirrors which direct said laser beam to the outside of the robot.

A preferred embodiment of the invention will now be described, given by way of a non limiting example, with reference to the enclosed drawings.

BRIEF DESCRIPTION OF THE DRAWINGS

In FIG. 1, 1 denotes broadly a power laser generator—known per se—placed in the vicinity of a multiaxis industrial robot on which is directed the beam coming from the generator 1.

DESCRIPTION OF PREFERRED EMBODIMENT

Figure 1:
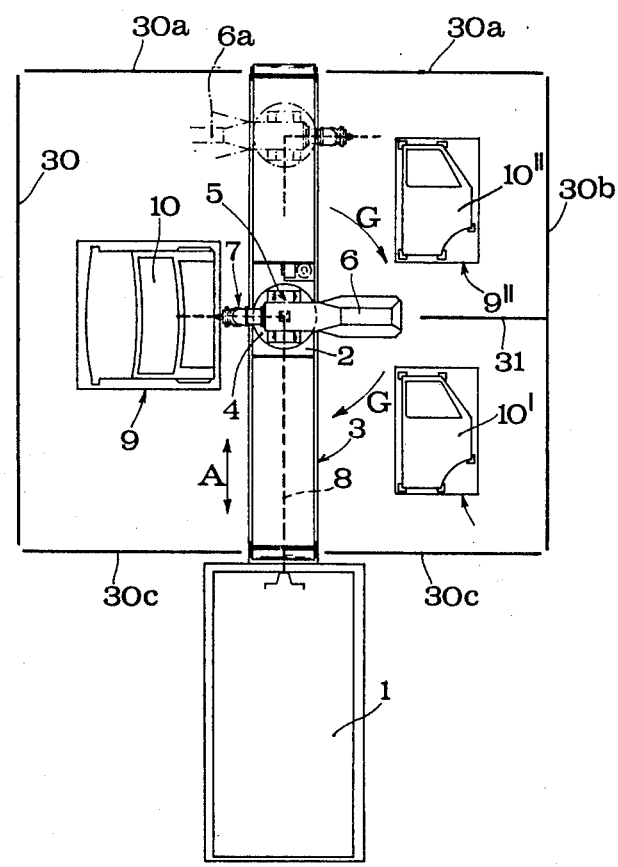
FIG. 1 is a plan schematic view of a laser beam robot according to the invention placed in the work area.

In the embodiment shown in the drawings, the robot comprises a slide 2 translating on a runway 3, a rotatable base 4, a support 5, a swinging arm 6 and a triaxial hollow head 7. The general structure of this robot, as far as the axes of movement and the hollow head are concerned, is known from the U.S. Pat. Nos. 4,151,390 and 4,430,037, according to which the robot was conceived solely as a machine for automatic welding designed for feeding and handling a welding tool.

The first movement of the robot is the translation along the runway 3 (arrow A) at the end of which is placed the generator 1 of a laser beam 8, with such an arrangement that the laser beam produced is parallel to the runway 3 and perpendicular to the support 5. At the sides of the runways 3 are arranged fixtures such as 9, 9', 9" for mounting stationary workpieces 10, 10', 10" on which cutting or welding operations are to be effected.

Figure 2:
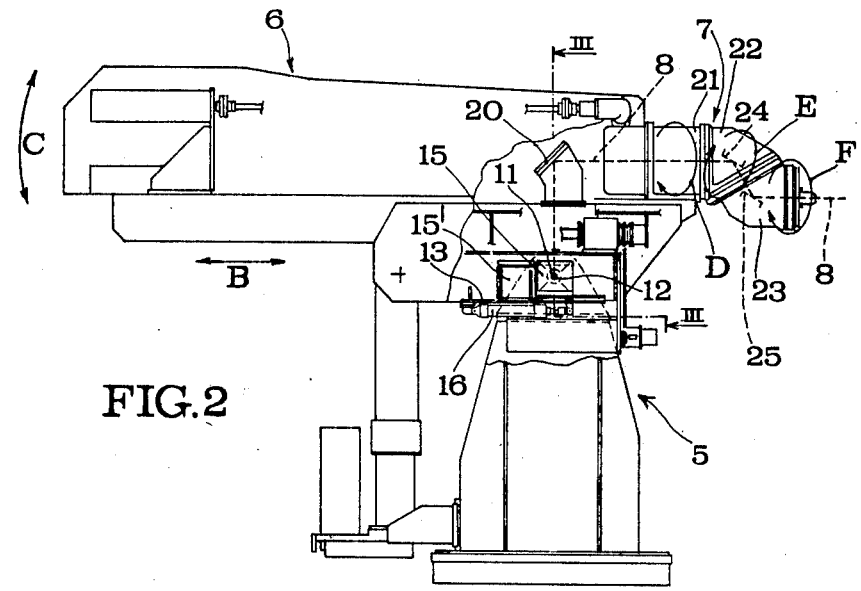
FIG. 2 is a fragmentary sectional side elevational view of the robot of FIG. 1.

With reference to FIG. 2, a second movement of the robot consists in the translation of the arm 6 following the arrow B and a third movement consists in rotation of the arm 6 with respect to the support 5, as indicated by arrow C.

Figure 3:
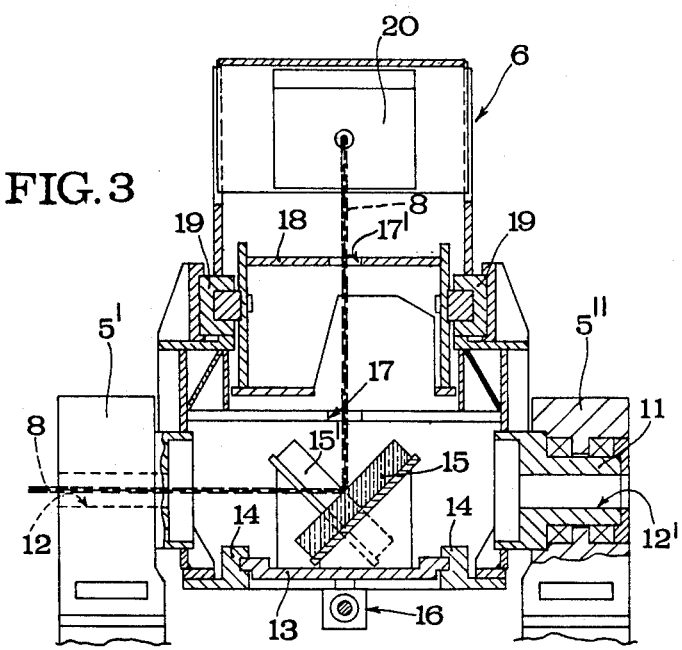
FIG. 3 is a sectional view taken on the line III—III of FIG. 2.

As shown also in FIG. 3, at the pin 11 around which swings the arm 6 are provided openings 12, 12' on each of the two sides 5', 5" of the support 5, for the inlet of the laser beam 8 inside the robot. In the lower center part of the arm 6 is mounted a slide 13 slidable on guides 14 in the same direction of arrow B of FIG. 2. On the slide 13 are arranged consecutively two mirrors 15, 15' at an angle of 45° with respect to the plane of the slide but in reversed mutual position, so as to expose the reflecting surface, the one towards the side 5' of the support of the arm 6 and the other towards the side 5". The slide 13 is connected to a pneumatic actuating cylinder 16, placed underneath, for the purposes which will be explained hereinafter.

The structure above described allowes the laser beam 8 to enter the robot until it becomes incident on the mirror 15, to be reflected thereby upwards at an angle of 90°. The inner structure of the arm, whose features are not described here in detail, is provided with two longitudinal matching slots 17, 17', capable of allowing for passage of the laser beam 8 through the girder 18—to which the head 7 is secured—slidable in guides 19 for movement along arrow B of FIG. 2. In the center portion of the arm 6 is further mounted a mirror 20, always at 45°, on which is incident the laser beam 8 coming from the mirror 15 to be reflected thereby towards the hollow head 7. This head consists substantially of three articulated parts 21, 22 and 23, capable of effecting three rotational movements indicated by arrows D, E, F. In the parts 22 and 23 are mounted two mirrors 24 and 25, respectively, in such an arrangement as to impart to the laser beam a path coaxial to the head for all possible movements of the latter.

Besides the six axes described, indicated by arrows A to F, the robot comprises a seventh axis defined by the rotation of the base 4 around the vertical, as shown by the arrow G of FIG. 1. Such rotation covers angles of 180° so as to allow to the robot to work on both sides of the runway 3, taking both the position indicated in full line in FIG. 1 and the opposed one, as shown by dash-and-dot line at 6a of the same figure.

When the robot takes this configuration, the laser beam 8 reaches the hole 12' of the side 5" of the support 5, and in this case actuation of the cylinder 16 is provided for in order to translate the slide 13 until the mirror 15' is caused to match the hole 12', thus still allowing the laser beam to reflect in the direction of the mirror 20.

Thanks to the six degrees of freedom of movement described, the robot is capable of directing the laser beam 8 emerging from the head 7 according to any desired spatial path, thus allowing the cutting or welding of prearranged workpieces without needing their handling, the whole with the use of only two pairs of reflecting mirrors.

The seventh axis (G) further allows the robot to operate on both sides of the runway 3, thus making full use of the work area. However, such feature is not essential for the invention since, if it is not desired to work on both sides of the runway 3, the robot can be manufactured without the rotatable base 4 by mounting directly the support 5 on the slide 2. Further, the reflecting mirrors are adjustably fitted on the robot, to secure their orientation as a function of the path to be imparted to the laser beam.

Among the advantages of the laser beam robot just described, the better use of the working areas should be stressed. In fact, since the workpieces 10, 10', 10'' can be kept stationary and the robot can be moved toward them, it is possible to work for instance on the piece 10 (FIG. 1) while the operators prepare the pieces 10' and 10'' on the associated fixtures, and then switch subsequently to said pieces while the operators remove the piece 10 already worked and set a fresh piece of the fixture 9.

All the work area is delimited by screens 30, 30a, 30b and 30c, as well as by inner diaphragms 31, in order to insulate the work area crossed by the laser beam of the adjacent zones, where there are the operators, for safety purposes.

While a preferred embodiment of the invention has been described, numerous modifications and changes may be brought without departing from the scope of the inventive idea.

I claim:

1. A power laser beam cutting or welding robot having at least six degrees of freedom of movement comprising a movable base, a support column mounted to said movable base, a swinging hollow arm mounted to said support column by a hinge pin, said hinge pin comprising a bearing, for swinging movement of the hollow arm thereabout, and a triaxial hollow head mounted to said arm, characterized in that said robot comprises at least one side opening in the hinge pin of said swinging arm in said support column, said opening comprising inlet means irrespective of robot arm position, for receiving therethrough a laser beam coming from an outer laser generator separate from said robot, a first pair of reflecting mirrors being mounted in said hollow arm, said first pair of reflecting mirrors comprising a lower mirror facing said side opening for the inlet of the laser beam, and of an upper mirror so arranged as to axially direct said laser beam coming from said lower mirror towards the hollow head of the robot, where a second pair of reflecting mirrors is mounted, whereby said laser beam is directed outside the robot according to an optical path determined by the movements of the robot.

2. A power laser beam cutting or welding robot according to claim 1, wherein a further side opening is provided, said side openings being provided on each side of said hinge pin of said swinging arm in said supporting column, in axial alignment.

3. A power laser beam cutting or welding robot having at least six degrees of freedom of movement comprising a movable base, a support column mounted to said movable base, a swinging hollow arm mounted to said support column by a hinge pin, and a triaxial hollow head mounted to said arm, characterized in that said robot comprises at least one side opening drilled in the hinge pin of said swinging arm in said support column, adapted to receive a laser beam coming from an outer laser generator separate from said robot, in said hollow arm being mounted a first pair of reflecting mirrors, consisting of a lower mirror facing said side opening for the inlet of the laser beam, and of an upper mirror so arranged as to axially direct said laser beam coming from said lower mirror towards the hollow head of the robot, where a second pair of reflecting mirrors is mounted, whereby said laser beam is directed outside the robot according to an optical path determined by the movements of the robot, wherein a further side opening is provided, said side openings being provided on each side of said hinge pin of said swinging arm in said supporting column, in axial alignment, wherein said lower mirror is mounted on a slide sliding longitudinally within said arm, on said slide being mounted a further mirror arranged axially adjacent to said lower mirror but in relation of contraposition thereto, said slide being connected to actuating means adapted to translate it until said further mirror is caused to match said further side opening, whereby said mirrors can match alternately each of said side openings.

4. A power laser beam cutting or welding robot adapted to direct the output beam of an external laser generator toward a workpiece comprising:
   a triaxial head; and
   directing means mounted to said head and having three degrees of freedom of movement and first and second reflecting surfaces mounted therein, said first reflecting surface being mounted so as to receive the output beam of an external laser generator and reflect it toward said second reflecting surface, and said second reflecting surface being mounted so as to receive the beam reflected from said first reflecting surface and reflect it toward said triaxial head along one axis thereof, wherein one degree of freedom of movement of said directing means is in rotation about an axis coincident with said output beam, said directing means including a base having an arm rotatably mounted thereto by means of a bearing member and an opening in said bearing member comprising (inlet means) irrespective of robot arm position for receiving therethrough a laser beam from an outer generator.

5. A robot according to claim 4, wherein one degree of freedom of movement of said directing means is in translation in the direction of said output beam.

6. A robot according to claim 4 or 5, wherein one degree of freedom of movement of said directing means is in translation in the direction of said one axis of said triaxial head.

7. A robot according to claim 4, wherein said directing means includes a third reflecting surface mounted in reversed mutual orientation to said first reflecting surface, and has additional freedom of movement whereby said third reflecting surface may be moved to a position where it is substituted for said first reflecting surface in receiving said output beam and reflecting it toward said second reflecting surface.

8. A robot according to claim 4, wherein said triaxial head has two and only two reflecting surfaces.

9. A power laser beam cutting or welding robot adapted to receive an incoming laser beam and direct it toward a workpiece comprising:
- a base, movable by translation in a direction parallel to said incoming laser beam;
- an arm, rotatably mounted to said base by means of a bearing member, with an axis of arm rotation collinear with said incoming laser beam;
- an opening in said bearing member and comprising inlet means irrespective of robot arm position for receiving therethrough a laser beam from an outer generator;
- a first reflecting surface in the arm, mounted to said arm and rotatable therewith so as to reflect said incoming laser beam in a second direction perpendicular to said first direction;
- a second reflective surface in the arm, mounted to said arm so as to receive the laser beam reflected from said first reflecting surface and reflect it in a third direction perpendicular to said second direction; and
- a triaxial hollow head, mounted to said arm and movable by translation in said third direction, which receives said laser beam reflected from said second reflecting surface and directs it toward said workpiece.

10. A robot according to claim 9 further comprising a third reflecting surface mounted to said arm and lying in a plane perpendicular to said first reflecting surface, and means for translating said first and third surfaces within said arm.

* * * * *

UNITED STATES PATENT OFFICE
CERTIFICATE OF CORRECTION

Patent No. 4,677,274          Dated   June 30, 1987

Inventor(s)    Bruno Bisiach

It is certified that error appears in the above-identified patent and that said Letters Patent are hereby corrected as shown below:

Column 4, Line 48, "(inlet means)" should be--"inlet means"--.

Column 5, Line 4, insert after "a" and before "direction" the word --"first"--.

Signed and Sealed this

Tenth Day of November, 1987

Attest:

DONALD J. QUIGG

Attesting Officer

Commissioner of Patents and Trademarks